US009838385B2

(12) United States Patent
DeLuca et al.

(10) Patent No.: US 9,838,385 B2
(45) Date of Patent: Dec. 5, 2017

(54) PASSWORD GENERATION BASED ON DYNAMIC FACTORS

(71) Applicant: International Business Machines Corporation, Armonk, NY (US)

(72) Inventors: Lisa Seacat DeLuca, San Francisco, CA (US); Soobaek Jang, Hamden, CT (US); Peter P. Rodriguez, Pleasanton, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/755,019

(22) Filed: Jun. 30, 2015

(65) Prior Publication Data

US 2017/0006012 A1  Jan. 5, 2017

(51) Int. Cl.
*H04L 29/06* (2006.01)
*H04L 9/32* (2006.01)

(52) U.S. Cl.
CPC .......... *H04L 63/083* (2013.01); *H04L 9/3228* (2013.01); *H04L 9/3297* (2013.01); *H04L 63/20* (2013.01)

(58) Field of Classification Search
CPC ......... H04L 29/06823; H04L 29/06782; H04L 63/083; H04L 9/3226; H04L 63/0846; H04L 9/0872
USPC .................................................. 713/182–183
See application file for complete search history.

(56) References Cited

U.S. PATENT DOCUMENTS

| 5,530,230 | A  | * | 6/1996  | Smith ................ H05B 6/6435 219/482 |
| 5,682,475 | A  | * | 10/1997 | Johnson ............ G07C 9/00142 713/183 |
| 6,178,236 | B1 |   | 1/2001  | Jreij et al. |
| 7,000,116 | B2 |   | 2/2006  | Bates et al. |
| 7,093,282 | B2 |   | 8/2006  | Hillhouse |
| 7,215,258 | B2 |   | 5/2007  | Wormald |
| 7,420,478 | B2 |   | 9/2008  | Wormald |
| 7,432,831 | B2 |   | 10/2008 | Wormald |
| 7,683,806 | B2 |   | 3/2010  | Wormald |

(Continued)

FOREIGN PATENT DOCUMENTS

WO    00/62458 A2    10/2000
WO    03/014887 A2   2/2003

(Continued)

OTHER PUBLICATIONS

Enhancing Face Recognition with Location Information, Hulsebosch et al, 10.1109/ARES.2008.45, IEEE, 2008.*

*Primary Examiner* — Jahangir Kabir
(74) *Attorney, Agent, or Firm* — William H. Hartwell; Hunter E. Webb; Keohane & D'Alessandro, PLLC

(57) ABSTRACT

In general, embodiments of the present invention relate to password management. Specifically, a user selects a variable parameter rule from among a set of variable parameter rules. The variable parameter rule includes a set of variable parameter values. The user defines two or more static passwords and maps each static password to a variable parameter value. To access a protected source, the user must enter a valid password that matches one of the static passwords based on a current variable parameter value associated with the variable parameter rule.

6 Claims, 3 Drawing Sheets

(56) References Cited

U.S. PATENT DOCUMENTS

| | | | |
|---|---|---|---|
| 8,095,962 B2 * | 1/2012 | Condon | G06F 21/577 |
| | | | 380/247 |
| 8,291,470 B2 | 10/2012 | Delia et al. | |
| 8,352,739 B2 | 1/2013 | Park et al. | |
| 8,443,432 B2 * | 5/2013 | Lu | G04G 3/04 |
| | | | 235/375 |
| 2002/0129283 A1 * | 9/2002 | Bates | G06F 21/31 |
| | | | 726/5 |
| 2007/0195447 A1 * | 8/2007 | Starr | G06F 3/0608 |
| | | | 360/72.1 |
| 2013/0036462 A1 * | 2/2013 | Krishnamurthi | G06F 21/32 |
| | | | 726/19 |
| 2014/0082710 A1 | 3/2014 | Lu et al. | |
| 2016/0212110 A1 * | 7/2016 | Barkie | H04L 63/067 |
| 2017/0208058 A1 * | 7/2017 | Zhou | H04L 63/061 |

FOREIGN PATENT DOCUMENTS

| | | |
|---|---|---|
| WO | 2005/002131 A1 | 1/2005 |
| WO | 2013/025091 A1 | 2/2013 |

* cited by examiner

PASSWORD GENERATION BASED ON DYNAMIC FACTORS

TECHNICAL FIELD

The present invention relates to password management. Specifically, the present invention provides securely managing passwords including generating a dynamic password by utilizing dynamically available data.

BACKGROUND

Today, security is a vitally important concern. It is well known that with the proliferation of computers and computer networks into all aspects of business and daily life, the concern over user and device security only continues to grow. Using passwords is a common method of providing security. Password protection and/or combination type locks are employed for computer network security, automatic teller machines, telephone banking, telephone answering services, houses, website access, and safes. These systems generally require the knowledge of an entry code that has been selected by a user or has been preset.

Today, each time a user is prompted to enter his password, the password is always identical to the one previously entered by the user unless the user has modified his password during a previous session. As such, many password systems are easily accessed through a simple trial and error process.

To make the system more difficult to break, the network system may be organized in such a way that regularly all the employees are prompted to change their password, or are required to run a specific routine to change their password. Often, the system allows the users to combine a non-determined number of letters, either small or capital, and digits in their passwords. During the time period lasting between two successive modifications of a password, the password remains unchanged. A competent person may find out the password of a user and access the protected resource.

SUMMARY

In general, embodiments of the present invention relate to password management. Specifically, a user selects a variable parameter rule from among a set of variable parameter rules. The variable parameter rule may be related to a timestamp, a temperature reading, a battery life, or the like. The variable parameter rule includes a set of variable parameter values. For example, variable parameter values may be numbers from zero to one hundred when the variable parameter rule is related to battery life of a device. The user defines two or more static passwords and maps each static password to a variable parameter value. To access a protected source, the user must enter a valid password that matches one of the static passwords based on a current variable parameter value associated with the variable parameter rule.

One aspect of the present invention includes a method for securely managing passwords, comprising the computer-implemented steps of: retrieving a set of variable parameter rules, wherein each variable parameter rule includes a plurality of variable parameter values; selecting a variable parameter rule from among the set of variable parameter rules; defining a first static password; defining a second static password; mapping the first static password to a first variable parameter value; and mapping the second static password to a second variable parameter value.

A second aspect of the present invention provides a system for secure password management, comprising: a memory medium comprising program instructions; a bus coupled to the memory medium; and a processor, for executing the program instructions, coupled to the memory medium that when executing the program instructions causes the system to: retrieve a set of variable parameter rules, wherein each variable parameter rule includes a plurality of variable parameter values; select a variable parameter rule from among the set of variable parameter rules; define a first static password; define a second static password; map the first static password to a first variable parameter value; and map the second static password to a second variable parameter value.

A third aspect of the present invention provides a computer program product for secure password management, the computer program product comprising a computer readable storage device, and program instructions stored on the computer readable storage device, to: retrieve a set of variable parameter rules, wherein each variable parameter rule includes a plurality of variable parameter values; select a variable parameter rule from among the set of variable parameter rules; define a first static password; define a second static password; map the first static password to a first variable parameter value; and map the second static password to a second variable parameter value.

BRIEF DESCRIPTION OF THE DRAWINGS

These and other features of this invention will be more readily understood from the following detailed description of the various aspects of the invention taken in conjunction with the accompanying drawings in which.

Figure 1:
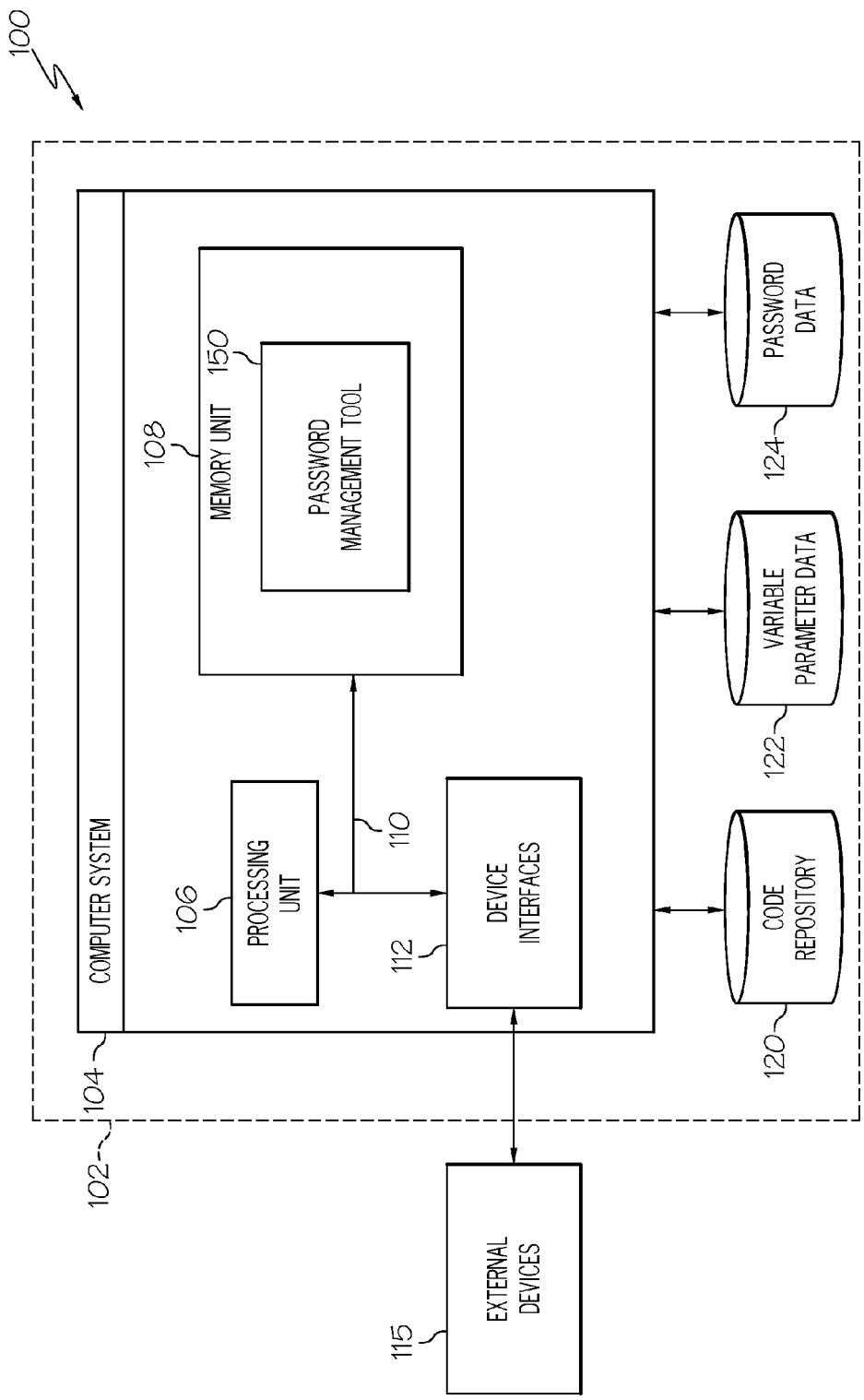
FIG. 1 depicts an example computerized implementation according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which exemplary embodiments are shown. This disclosure may, however, be embodied in many different forms and should not be construed as limited to the embodiments set forth herein. Rather, these illustrative embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise.

Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Furthermore, the term "developer" refers to any person who writes computer software. The term can refer to a specialist in one area of computer programming or to a generalist who writes code for many kinds of software.

As indicated above, embodiments of the present invention relate to password management. Specifically, a user selects a variable parameter rule from among a set of variable parameter rules. The variable parameter rule includes a set of variable parameter values. The user defines two or more static passwords and maps each static password to a variable parameter value. To access a protected source, the user must enter a valid password that matches one of the static passwords based on a current variable parameter value associated with the variable parameter rule.

FIG. 1 depicts a computerized implementation 100 according to an embodiment of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communication links. For example, the communication links can comprise addressable connections that may utilize any combination of wired and/or wireless transmission methods. Where communication occurs via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for providing a passport according to the present invention. It should be understood that any other computers implemented under the present invention may have different components/software, but will perform similar functions. As shown, computer system 104 includes a processing unit 106, memory 108 for storing a password management tool 150, a bus 110, and device interfaces 112.

Processing unit 106 collects and routes signals representing outputs from external devices 115 (e.g., a keyboard, a pointing device, a display, a graphical user interface, etc.) to password management tool 150. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG).)

In general, processing unit 106 executes computer program code, such as program code for operating password management tool 150, which is stored in memory 108 and/or code repository 120. While executing computer program code, processing unit 106 can read and/or write data to/from memory 108, code repository 120, variable parameter data 122, and/or user data 124. Code repository 120, variable parameter data 122, and/or user data 124 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

The use of strong passwords can slow or often defeat the various attack methods of compromising a user's security. Although many alternatives for user authentication are available today, most users log on to their computer and on to remote computers using a combination of their user name and a password typed at their keyboard. Some retailers will configure their Point of Service terminals to auto login or boot. Some retailers will allow the user to select their own password. To make it easier to remember their passwords, users often use the same or similar passwords on each system, and, given a choice, most users will select a very simple and easy-to-remember password such as their birthday, their mother's maiden name, or the name of a relative. Short and simple passwords are relatively easy for attackers to determine.

Figure 2:
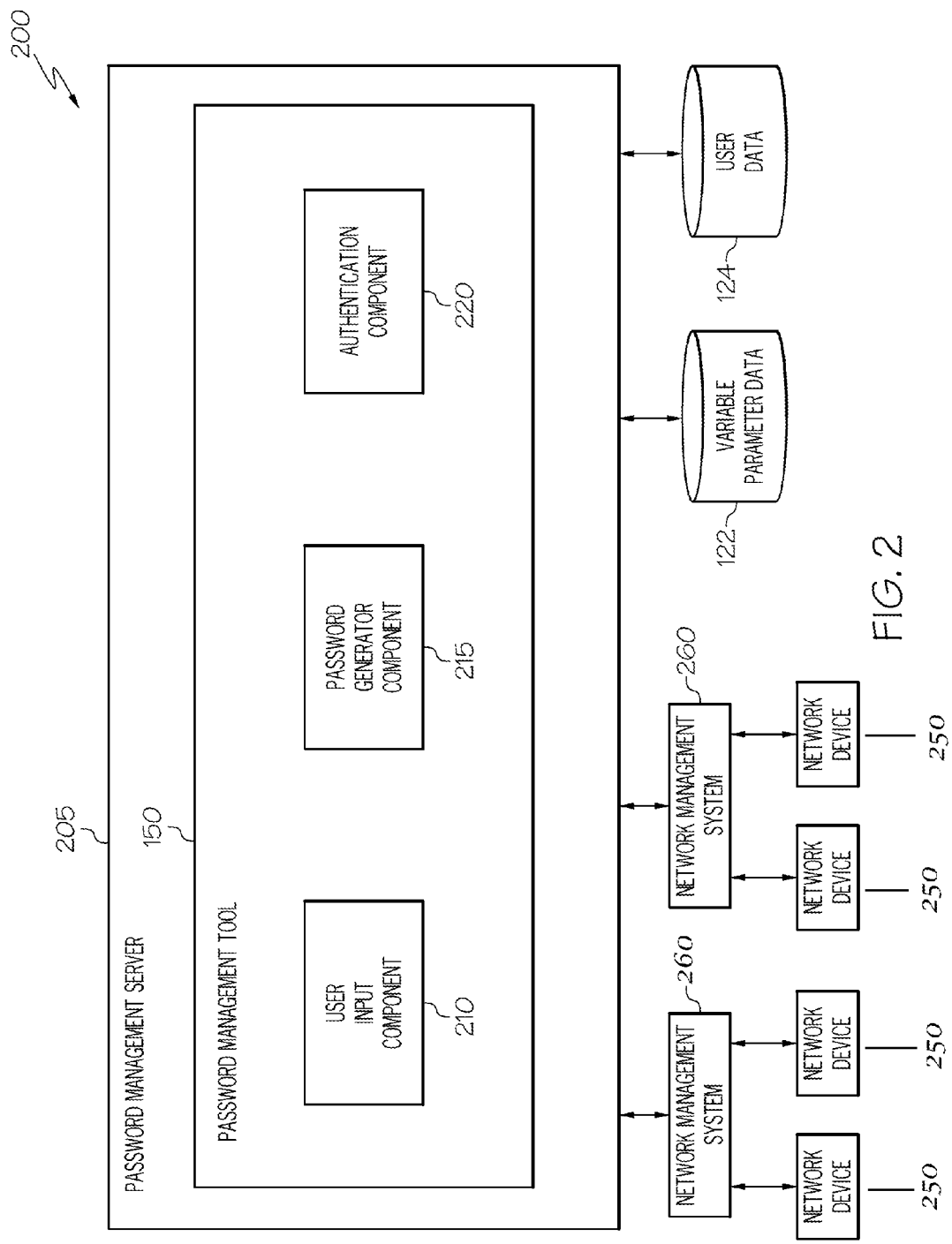
FIG. 2 depicts a functional block diagram illustrating a password management environment according to an embodiment of the present invention.

FIG. 2 depicts a functional block diagram illustrating a password management environment 200 according to an embodiment of the present invention. The management system includes at least a password management server 205 adapted to centrally manage user passwords of numerous network devices 250 and connected with at least one network management system 260, each of which manages a plurality of network devices 250. Network device 250 can be a laptop computer, a tablet computer, a netbook computer, a personal computer (PC), a desktop computer, a personal digital assistant (PDA), a smart phone, or any programmable electronic device capable of communicating with network management system 260.

The password management server 205 is connected with the network devices 250 through the network management system 260. Since in the invention the network management system 260 just acts as a bridge through which information interaction is enabled between the password management server 205 and the network devices 250 and therefore will be skipped below, the invention will be set forth in detail by way of an example in which information interaction can be enabled directly between the password management server 205 and the network devices 250.

The password management server 205 includes password management tool 150. The password management tool 150 includes user input component 210, password generator component 215, and authentication component 220. A user may need to supply the proper credentials to access a protected resource. The user may generate (i.e., create or change) a set of passwords as part of the proper credentials associated with the user. To that end, the password generator component 215 provides a set of variable parameter rules to the user. In one example, the set of variable parameter rules are retrieved from variable parameter data 122. The user input component 210 receives a variable parameter rule selection from among the set of variable parameter rules. The variable parameter rule includes a set of variable parameter values. Next, the user input component 210 receives two or more static passwords. The password generator component 215 maps the two or more static user passwords to a variable parameter value. In one example, the password generator component 215 stores the two or more static user passwords and selected variable parameter rule in user data 124. Additionally, a username associated with the two or more static user passwords, along with the selected variable parameter rule, may also be stored in user data 124.

When the user wishes to access the protected resource, the selected variable parameter rule is determined by authentication component 220. In one example, the selected variable parameter rule may be determined based on an associated username received by user input component 210. The user input component 210 receives a password entry. The authentication component 220 determines a current variable parameter value associated with the selected variable parameter rule. The authentication component 220 determines whether the input password is valid by comparing the input password to the mapped static password associated with the current variable parameter value. If the password is valid, the authentication component 220 grants access to the protected resource. The operations of password management environment 200 will be described in more detail with reference to a method flow diagram of FIG. 3.

Figure 3:
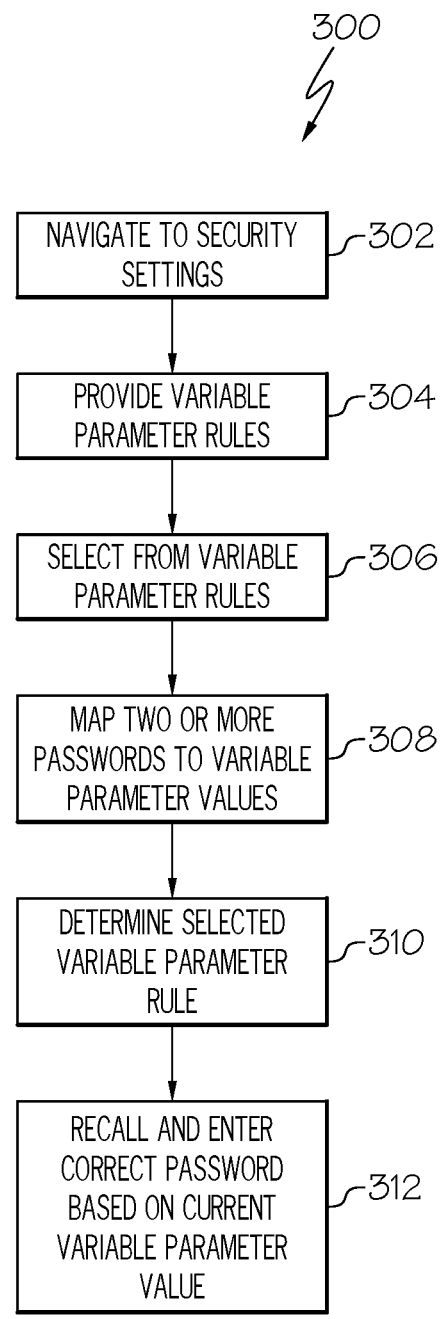
FIG. 3 depicts an example method flow diagram for generating a dynamic password according to an embodiment of the present invention.

FIG. 3 depicts an example method flow diagram 300 for generating a dynamic password according to an embodiment of the present invention. At 302, a user navigates to security settings on network device 250. The security settings are related to gaining access to a protected resource. For example, a user may wish to update his password data that is needed to access a restricted website. At 304, a set of variable parameter rules is provided to the user by password generator component 215. In one example, the set of variable parameter rules is retrieved from variable parameter data 122. The set may be based on dynamic data being displayed on the network device 250, such as the minute of the current time, the hour of the current time, the one's digit of the minute of the current time, and/or the ten's digit of the minute of the current time.

Alternatively or in addition, the set may include the current day of the week (e.g., '1' for Sunday, '2' for Monday, and so on), the current day of the month, the current day as an odd or even number, the current month of the year, the one's digit of the current temperature, the ten's digit of the current temperature, and/or the current percentage of battery life (e.g., 78%) of the network device 250. The example variable parameter rules listed above are exemplary only and not intended to be limiting. Other variable parameter rules (or dynamically available data) may be provided to the user.

At 306, the user selects a variable parameter rule to map to two or more defined passwords using user input component 210. For example, the user may select to use password 1 on even numbered days of the month and password 2 on odd numbered days of the month. At 308, the user inputs two or more passwords to be mapped to unique variable parameter values. The variable parameter values are associated with the selected variable parameter rule. For example, the user may define password 1 as 'ABC' to be used on the even numbered days and password 2 as '123' to be used on the odd numbered days. In one example, the defined passwords and selected variable parameter rule may be stored in user data 124.

The user must enter the correct password based on the variable parameter rule when logging in to gain access to the protected resource. At 310, the selected variable parameter rule is determined by authentication component 220. Continuing the example above, the user selected to use password 1 on even numbered days of the month and password 2 on odd numbered days of the month. At 312, the user must recall and enter the correct password based on the current variable parameter value associated with the selected variable parameter rule to gain access to the protected resource. For example, if today were Jul. 31, 2013 then the password to unlock the protected resource would be '123' since the day of the month (i.e., 31) is odd. The next day (i.e., Aug. 1, 2013) the user goes to access the protected resource, he would still enter the '123' password. But the following day, Aug. 2, 2013, is an even day, and therefore the user would need to enter 'ABC' to be granted access. If the user enters the correct password, authentication component 220 allows the user access to the protected resource.

It will be appreciated that the method process flow diagram of FIG. 3 represents a possible implementation of a process flow for increased password security, and that other process flows are possible within the scope of the invention. The method process flow diagram discussed above illustrates the architecture, functionality, and operation of possible implementations of systems, methods, and computer program products according to various embodiments of the present invention. In this regard, each portion of the flowchart may represent a module, segment, or portion of code, which comprises one or more executable instructions for implementing the specified logical function(s). It will also be noted that each block of the flowchart illustration can be implemented by special purpose hardware-based systems that perform the specified functions or acts.

Further, it can be appreciated that the approaches disclosed herein can be used within a computer system for increased password security. In this case, as shown in FIG. 1, password management tool 150 can be provided, and one or more systems for performing the processes described in the invention can be obtained and deployed to computer infrastructure 102 (FIG. 1). To this extent, the deployment can comprise one or more of: (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 104 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 104 may be practiced in distributed computing environments where tasks are performed by remote processing devices that are linked through a communication network. In a distributed computing environment, program modules may be located in both local and remote computer storage media including memory storage devices.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, password management tool 150 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network (for example, the Internet, a local area network, a wide area network, and/or a wireless network). The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet service provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create a means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

It is apparent that there has been provided with this invention an approach for increased password security. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for securely managing passwords, comprising the computer-implemented steps of:
retrieving a set of variable parameter rules, wherein each variable parameter rule includes a plurality of variable parameter values;
selecting a variable parameter rule from among the set of variable parameter rules, wherein the selected variable parameter rule is related to a temperature reading;
defining a first static password;
defining a second static password;
defining a third static password;
storing the first static password, the second static password, the third static password, and the selected variable parameter rule to a storage area of a server;
mapping the first static password to a first variable parameter value, the first variable parameter value including a first temperature range;
mapping the second static password to a second variable parameter value, the second variable parameter value including a second temperature range that is higher than the first temperature range;
mapping the third static password to a third variable parameter, the third variable parameter value including a third temperature range that is between the first temperature range and the second temperature range;
receiving an input password as input from a user;
determining a current variable parameter value associated with the selected variable parameter rule;
determining whether the input password matches either the first static password, the second static password, or the third static password based on the current variable parameter value associated with the selected variable parameter rule; and
authenticating the user based on the password validation.

2. The method of claim 1, wherein the selected variable parameter rule is additionally related to a battery life and includes a plurality of battery life ranges.

3. A system for secure password management, comprising:
a memory medium comprising program instructions; a system bus coupled to the memory medium; and
a processor, for executing the program instructions, coupled to the memory medium that when executing the program instructions causes the system to:
retrieve a set of variable parameter rules, wherein each variable parameter rule includes a plurality of variable parameter values;
select a variable parameter rule from among, the set of variable parameter rules, wherein the selected variable parameter rule is related to a temperature reading;
define a first static password;
define a second static password;
define a third static password;
store the first static password, the second static password, the third static password, and the selected variable parameter rule to a storage area of a server;
map the first static password to a first variable parameter value, the first variable parameter value including a first temperature range;
map the second static password to a second variable parameter value, the second variable parameter value including a second temperature range that is higher than the first temperature range;
map the third static password to a third variable parameter, the third variable parameter value inducting a third temperature range that is between the first temperature range and the second temperature range;
receive an input password as input from a user;
determine a current variable parameter value associated with the selected variable parameter rule;
determine whether the input password matches either the first static password, the second static password, or the third static password based on the current variable parameter value associated with the selected variable parameter rule; and
authenticate the user based on the password validation.

4. The system of claim 3, wherein the selected variable parameter rule is additionally related to a battery life and includes a plurality of battery life ranges.

5. A computer program product for secure password management, the computer program product comprising a computer readable storage device, and program instructions stored on the computer readable storage device, when executed configures to:
retrieve a set of variable parameter rules, wherein each variable parameter rule includes a plurality of variable parameter values;
select a variable parameter rule from among the set of variable parameter rules, wherein the selected variable parameter rule is related to a temperature reading;

define a first static password;
define a second static password;
define a third static password;
store the first static password, the second static password, the third static password, and the selected variable parameter rule to a storage area of a server;
map the first static password to a first variable parameter value, the first variable parameter value including a first temperature range;
map the second static password to a second variable parameter value, the second variable parameter value including a second temperature range that is higher than the first temperature range;
map the third static password to a third variable parameter, the third variable parameter value including, a third temperature range that is between the first temperature range and the second temperature range;
receive an input password as input from a user;
determine a current variable parameter value associated with the selected variable parameter rule;
determine whether the input password matches the first static password, the second static password, or the third static password based on the current variable parameter value associated with the selected variable parameter rule; and
authenticate the user based on the password validation.

6. The computer program product of claim 5, wherein the selected variable parameter rule is additionally related to a battery life and includes a plurality of battery life ranges.

* * * * *